United States Patent [19]

Lindberg et al.

[11] Patent Number: 5,039,153
[45] Date of Patent: Aug. 13, 1991

[54] PIVOT DOWN VANITY MIRROR ASSEMBLY

[75] Inventors: Kenneth M. Lindberg, Holland; Craig Robbins, Grand Haven, both of Mich.

[73] Assignee: Prince Corporation, Holland, Mich.

[21] Appl. No.: 398,946

[22] Filed: Aug. 28, 1989

[51] Int. Cl.⁵ .............................................. B60N 3/00
[52] U.S. Cl. ...................... 296/37.7; 16/297; 16/303; 16/341; 16/342; 296/97.5; 296/97.13; 362/135; 362/136; 362/140; 362/141; 362/144
[58] Field of Search .............. 296/37.7, 37.8, 97.5, 296/97.12, 97.13; 362/135, 136, 140, 141, 142, 144; 16/297, 303, 325, 341, 342, 344, 347; 350/604, 632

[56] References Cited

U.S. PATENT DOCUMENTS

| 1,819,516 | 8/1931 | Kelly | 296/37.7 |
| 2,060,062 | 10/1936 | Fischer | 362/75 |
| 4,227,241 | 10/1980 | Marcus | 362/61 |
| 4,428,612 | 1/1984 | Viertel et al. | 296/97.12 |
| 4,469,365 | 9/1984 | Marcus et al. | 296/37.7 |
| 4,617,699 | 10/1986 | Nakamura | 16/342 X |
| 4,724,551 | 2/1988 | Gardner | 16/347 X |
| 4,824,519 | 4/1989 | Fluharty et al. | 296/37.7 |
| 4,841,599 | 6/1989 | Cebollero | 296/97.13 X |

FOREIGN PATENT DOCUMENTS

| 132419 | 5/1989 | Japan | 296/97.12 |
| 1354485 | 5/1974 | United Kingdom | 296/97.12 |

Primary Examiner—Margaret A. Focarino
Assistant Examiner—Andrew C. Pike
Attorney, Agent, or Firm—Price, Heneveld, Cooper, DeWitt & Litton

[57] ABSTRACT

A vanity mirror assembly includes a housing which is adapted to be mounted to the roof structure of a vehicle and a generally L-shaped pivot rod with one end locked to the housing and an opposite end pivotally mounted to a vanity mirror frame. The pivot rod includes an offset portion defining a cam which engages a cam surface on the frame to control the pivotal motion of the frame with respect to the housing.

17 Claims, 2 Drawing Sheets

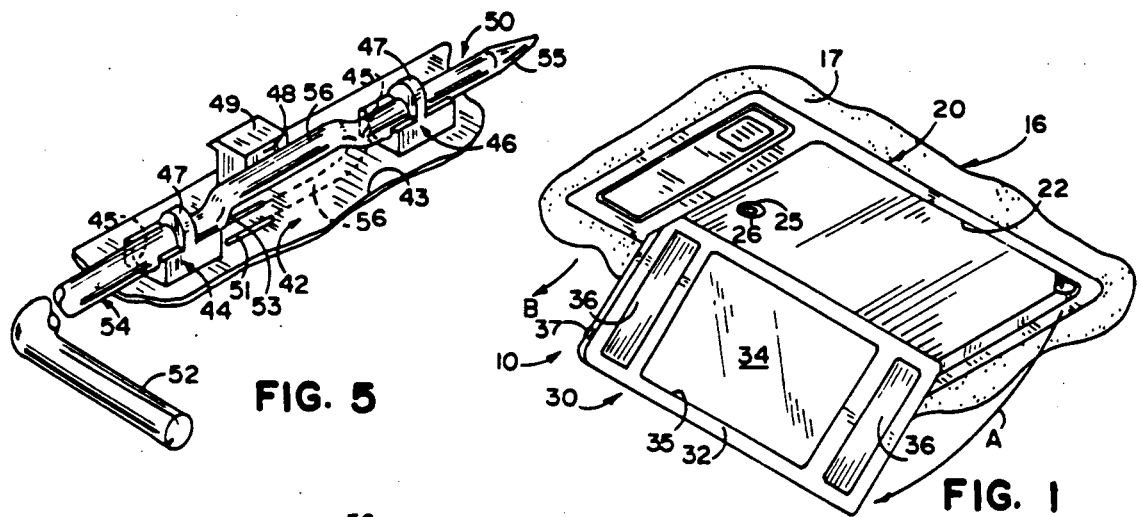
FIG. 5
FIG. 1
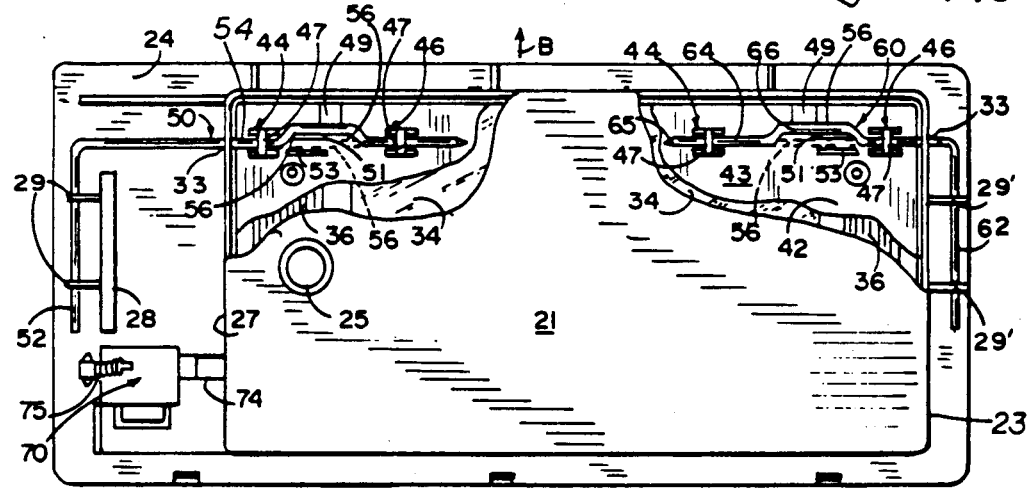
FIG. 3
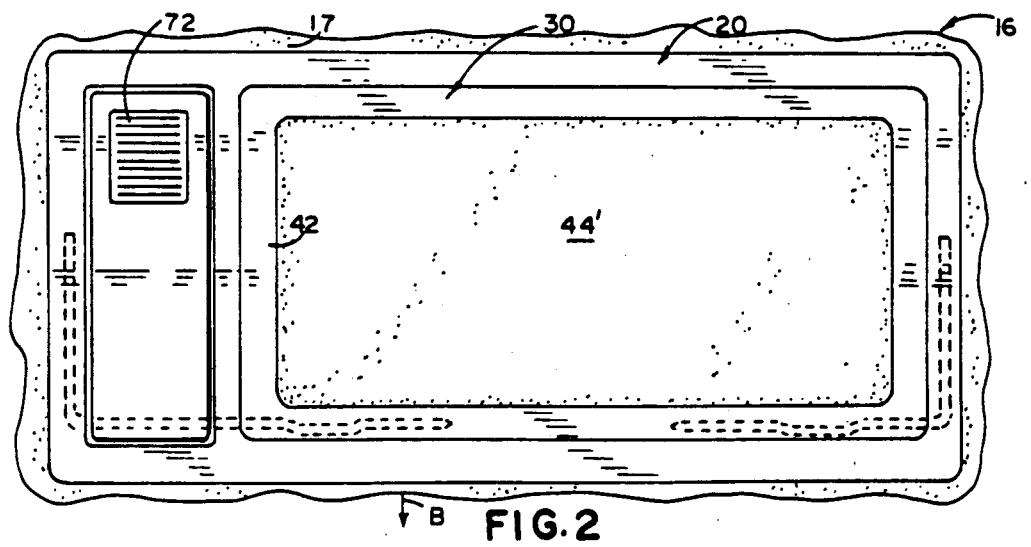
FIG. 2

PIVOT DOWN VANITY MIRROR ASSEMBLY

BACKGROUND OF THE PRESENT INVENTION

The present invention pertains to vanity mirror assemblies, and particularly to ones which pivot downwardly from a stored position in a vehicle roof.

Vanity mirrors, and particularly illuminated vanity mirrors, have become an increasingly popular accessory in vehicles. Many vehicles, in fact, include as standard equipment illuminated vanity mirrors in a visor such as disclosed in U.S. Pat. No. 4,227,241. Other locations for the illuminated vanity mirrors have been proposed including the roof of the vehicle. U.S. Pat. No. 4,824,159 discloses a pivot down rotatable illuminated vanity mirror, which can be mounted to the roof of a vehicle, for use by either front or rear seat passengers. Due to the somewhat heavy weight of the illuminated vanity mirror packages, such as disclosed in the above 4,824,159 patent, it is necessary to provide a pivot control mechanism which allows for the controlled movement of the assembly from a stored position to a lower adjusted use position. Such control mechanism may take the form, as disclosed in the above identified patent, of a pair of generally U-shaped torque fittings which are separately mounted to the housing and engage pivot rods mounted to the vehicle. Although such mechanism provides smooth operation and control of the illuminated vanity mirror, the additional cost of the torque fittings, as well as the assembly of the fittings, adds to the overall cost of the vanity mirror assembly.

SUMMARY OF THE PRESENT INVENTION

The vanity mirror assembly of the present invention provides the advantage of a drop-down pivoted illuminated vanity mirror assembly in the preferred embodiment, utilizing an improved pivot control mechanism, which provides smooth and controlled action for the illuminated vanity mirror, and a minimum of parts thereby greatly reducing the cost of the assembly, as well as reducing the possibility of failure due to breakage. The structure includes means for lockably receiving an end of at least one pivot rod for holding said rod to the housing against rotation and a vehicle accessory such as a vanity mirror assembly pivotally mounted to the opposite end. The pivot rod includes a radially offset section which serves as camming means which interengages a camming surface associated with the vanity mirror assembly for controlling the pivoting of the vanity mirror assembly with respect to the housing. In a preferred embodiment of the invention, the vanity mirror assembly also includes a notch for holding the radially offset section of said pivot rod in a predetermined lowered use position in a snap-lock fashion.

Such construction allows the smooth guided and controlled action of a vehicle accessory from a housing utilizing relatively inexpensive components and eliminating additional control devices such as torque clips or the like. A swing down vanity mirror is particularly well suited for use in the roof of a vehicle and particularly in an area for use by rear seat passengers. These and other features, objects, and advantages of the present invention will become apparent upon reading the following description thereof together with reference to the accompanying drawings in which:

BRIEF DESCRIPTION OF THE DRAWINGS

FIG. 1 is a fragmentary perspective view of the structure of the present invention shown mounted in the roof of a vehicle and in a lowered use position;

FIG. 2 is an enlarged fragmentary plan view of the structure shown in FIG. 1, shown in the stored position with the lower area of the structure shown in FIG. 2 being located forwardly in the vehicle;

FIG. 3 is a rear view of the structure of the present invention shown in FIG. 2, shown partly broken away;

FIG. 5 is an enlarged fragmentary perspective view, partly broken away of the mounting structure for the pivot rod employed in connection with the present invention.

DETAILED DESCRIPTION OF THE PREFERRED EMBODIMENT

Figure 4:
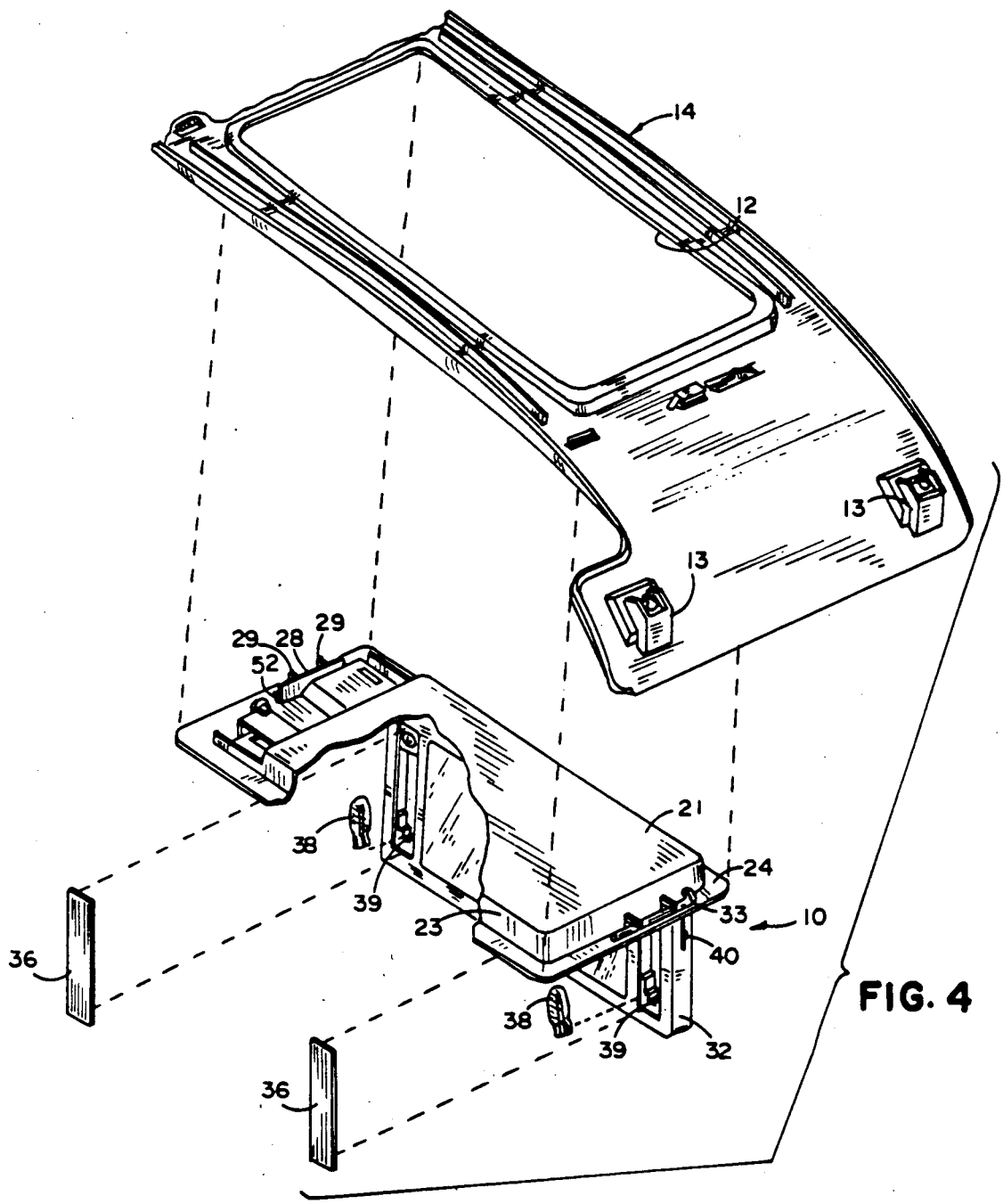
FIG. 4 is an exploded fragmentary perspective view, partly broken away of the structure of the present invention and its mounting relationship to a vehicle console.

Referring initially to FIGS. 1 and 4, there is shown a vehicle accessory, such as a vanity mirror assembly 10, incorporating the present invention and which is mounted within an aperture 12 (FIG. 4) of a transversely extending vehicle console 14 sometimes referred to as a targaband. The targaband 14 is mounted to the vehicle roof, typically above the front seat, such that vanity mirror assembly 10 would be located above and slightly forwardly of the rear seats of the vehicle. It is to be understood that the targaband 14 includes two such recesses 12, one being located on each side for receiving two of the vanity mirror assemblies 10 of the present invention, with only one being shown in the Figs. Targaband 14 can be mounted to the vehicle roof 16 in a substantially conventional manner and includes for such purpose a plurality of mounting bosses 13 for receiving fastening screws for attaching the targaband to the vehicle roof mounting structure The vanity mirror assembly 10, of the present invention, includes a housing 20 and a vanity mirror frame assembly 30 which is pivotally mounted at its upper edge as seen in FIG. 2 within a recess 22 and housing 20 by means of a pair of generally L-shaped pivot axles 50 and 60 (FIG. 3). L-shaped pivot axles 50 and 60 are also referred to as rods. The vanity mirror frame assembly 30 thus can pivot between a raised stored position, as seen in FIG. 2 in which it is latched within the recess 22, to a lowered use position as shown in FIG. 1, moving downwardly in a direction indicated by arrow A of FIG. 1 for use. As seen in FIGS. 1 and 2, arrow B indicates the forward direction in the vehicle toward the vehicle windshield. Having briefly described the overall location and operation of the vanity mirror assembly 10 of the present invention, a detailed description of the components is now presented in connection with FIGS. 2-5.

Housing 20 comprises a generally downwardly facing rectangular pan defined by rectangular floor 21 peripheral sidewalls 23, and a generally outwardly extending peripheral flange 24. At least one aperture 25 is formed in the floor 21 for receiving a fastening screw 26 (FIG. 1) for securing the housing to the sheet metal support structure (not shown) associated with the vehicle roof 16, such that the housing and vanity mirror frame assembly are secured within the recess 12 of targaband 14 and to the vehicle roof with the trim flange 24 overlaying the upholstery material 17 of the vehicle to provide a trim and neat appearance to the installation. A latch mechanism 70 (FIG. 3) is secured to one side of the flange 24 and as seen in FIG. 2 includes a push-button 72 mounted to a spring loaded latching dog 74 which is normally held in a closed locked position by spring 75. The end of dog 74 extends through an aperture in sidewall 27 of housing 20 to lockably engage a notch 37 of vanity mirror frame assembly 30 (FIG. 1) for holding the vanity mirror assembly in a raised stored position shown in FIG. 2. The in and out motion of push-button 72 is converted to the lateral motion of dog 74 by a conventional tapered cam mechanism (not shown). Other latching controls could also however be used.

Housing 20 also includes means for anchoring or lockably holding the first ends 52 and 62 of pivot rods 50 and 60, respectively. For such purpose, housing 20 includes a wall 28 (FIGS. 3 and 4) on one side having a pair of spaced legs 29 extending outwardly therefrom for holding the end 52 and pivot rod 50 under legs 29 and between such legs and the upper surface of flange 24. Similarly, the right side of wall 23 also includes a pair of arms 29' extending outwardly therefrom for holding end 62 of pivot rod 60 under them and between them and the upper surface of flange 24, as best seen in FIG. 4. Walls 23 and 27 also include aperture 33 extending through each of the sides for allowing the pivot rods 50 and 60 to extend through walls 23 and 27 and communicate with the vanity mirror frame assembly 30.

The vanity mirror frame assembly 30 includes a generally rectangular mirror frame 32 having a rectangular opening 35 behind which there is mounted a mirror 34. On opposite sides of the mirror there are mounted a pair of lenses 36 associated with lamp means 38 (FIG. 4) which mount within sockets 39. Electrical conductors are coupled to the sockets 39 with switch means including a dimming switch 40 mounted on the right side of frame 32. The details of the electrical circuit are not shown, but can be of the type generally disclosed in U.S. Pat. No. 4,824,159, the disclosure of which is incorporated herein by reference.

Behind mirror 34 which is secured to frame 32, there is provided a cover panel 42 having a decorative upholstery insert 44' (FIG. 2) which provides a neat attractive appearance for the illuminated vanity mirror assembly when in a raised stored position. The inner surface 43 of panel 42, as best seen in FIGS. 3 and 5, include a pair of coaxially aligned spaced mounting bosses 44 and 46 to rotatably support the opposite or second ends of pivot rods 50 and 60. For such purpose each of the mounting bosses include a generally semi-cylindrical seat portion 45 and a narrowed collar portion 47 which surrounds the cylindrical pivot rods as best see in FIG. 5.

Bosses 44 and 46 can be integrally molded with floor or panel 42 which is made of a suitable polymeric material such as polycarbonate. Between mounting bosses 44 and 46 there are provided a camming surface 48 which is positioned adjacent each of the pivot axles 5 and which is in the form of a block 49 also integrally molded to floor 42 and positioned between mounting bosses 44 and 46 and axially offset to one side thereof. Floor 42 also includes a pair of spaced parallel ribs 51 and 53 between and in axial alignment with each of the mounting bosses 44 and 46 for defining a notch or channel into which the axle can snap-lock for holding the vanity mirror assembly in a lowered use position as illustrated in FIG. 1 and described in greater detail below.

Each of the pivot axles 50 and 60 are substantially identical and corresponding parts are identified by the same significant digit of the reference number. Axle 50 is a generally L-shaped cylindrical steel rod formed, as best seen in FIGS. 3 and 5, to include a first leg 52 and a second leg 54. The end of leg 54 remote from leg 52 includes a tapered point 55 for insertion through the circular apertures in bosses 44 and 46 during assembly. Rod 50 includes an axially offset segment 56, which is offset an amount substantially equal to one half the diameter of the 1.72 inch diameter rod 50 to provide a cam action and torque fitting by frictional engagement with camming surface 48 of block 49. In FIGS. 3 and 5, both of the pivot rods 50 and 60 are shown in the raised stored position of the sanity mirror in solid lines and in phantom lines in the lowered use position Offset segment 56 is longitudinally aligned therefore with block 49, as well as the locking channel defined by ribs 51 and 53, as best seen in FIGS. 3 and 5.

The length of segment 56 is somewhat shorter than the spacing between bosses 44 and 46 to allow assembly of the unit which is facilitated by making the mirror frame 32 removable from floor 42 in a conventional manner such as by fasteners which fit behind the snap-in lenses 36 Assembly is achieved by pushing the pointed ends 55 and 65 of rods 50 and 60, respectively, through apertures 33 in sidewalls 23 of the housing while positioning the illuminated vanity mirror frame assembly 30 with mounting bosses 44 and 46 in axial alignment with the pivot rods. The pivot rods are then pushed through the apertures defined by the mounting bosses which are sufficiently resilient to allow the pivot rods to be forced-fitted therethrough and into a position shown in FIG. 3. The ends 52 and 62 of the pivot rods are then fitted under legs 29 and 29', respectively, for locking the pivot rods in place. For such purpose, the downwardly facing contacting edge of legs 29 and 29' may include a semi-cylindrical socket for snap-locking the ends 52 and 62 of rods 50 and 60 in place.

The structure therefore provides a relatively uncomplicated and therefore inexpensive and easy to assembly pivot rod and torque mechanism for controlling the motion of a vehicle accessory such as the illuminated vanity mirror frame assembly 30 between a raised stored position and a lowered use position and provides sufficient torque such that the position can be adjusted although the preferred position includes a snap latch defined by the channel spacing between ribs 51 and 53. It will become apparent to those skilled in the art that various modifications to the preferred embodiment of the invention can be made without departing from the spirit or scope thereof as defined by the appended claims.

The embodiments of the invention in which an exclusive property or privilege is claimed are defend as follows:

1. A vanity mirror assembly comprising:
   housing means attachable to a vehicle;
   a vanity mirror frame assembly including a mirror mounted therein, said frame assembly including means for receiving one end of a pivot rod for pivotally mounting said rod therein; and
   said pivot rod being generally L-shaped and having said one end extending into said vanity mirror frame assembly and a second end anchored to said housing means, said pivot rod including an axially offset segment for engaging said vanity mirror frame assembly to provide frictional torque therebetween for controlling motion of said vanity mirror frame assembly with respect to said housing means;

wherein said vanity mirror frame assembly further includes a pair of spaced mounting bosses having cylindrical apertures for receiving said pivot rod with said offset segment positioned between said mounting bosses.

2. The apparatus as defined in claim 1 wherein said vanity mirror frame assembly further includes a camming surface positioned between said mounting bosses and adjacent thereto for engaging said offset segment of said pivot rod.

3. The apparatus as defined in claim 2 wherein said vanity mirror frame assembly further includes a floor which carries said mounting bosses and said camming surface and wherein said floor includes means defining a channel aligned between said mounting bosses for snap-lock receiving said offset segment of said pivot rod when said vanity mirror frame assembly is in a lowered use position.

4. The apparatus as defined in claim 3 wherein said one end of said pivot rod is tapered to facilitate assembly of said pivot rod within said mounting bosses.

5. The apparatus as defined in claim 4 wherein said offset segment is offset approximately one half a diameter of said pivot rod.

6. The apparatus as defined in claim 5 wherein said mounting bosses are made of resilient polymeric material.

7. The apparatus as defined in claim 6 wherein said mounting bosses are made of polycarbonate.

8. The apparatus as defined in claim 7 wherein said vanity mirror frame assembly further includes means for receiving a second pivot rod.

9. The apparatus as defined in claim 8 wherein said second pivot rod is generally L-shaped.

10. A mounting assembly for a vehicle accessory comprising:

housing means attachable to a vehicle;

the vehicle accessory including means for receiving one end of a pivot rod for pivotally mounting said rod thereto; and said pivot rod being generally L-shaped and having said one end extending into said accessory and a second end anchored to said housing means, said pivot rod including an axially offset segment for engaging said accessory to provide fictional torque therebetween for controlling pivotal motion of said accessory with respect to said housing means;

wherein said accessory further includes a pair of spaced mounting bosses having cylindrical apertures for receiving said pivot rod with said offset segment positioned between said mounting bosses.

11. The apparatus as defined in claim 10 wherein said accessory further includes a camming surface positioned between said mounting bosses and adjacent thereto for engaging said offset segment of said pivot rod.

12. The apparatus as defined in claim 11 wherein said accessory further includes a floor which carries said mounting bosses and said camming surface and wherein said floor includes means defining a channel aligned between said mounting bosses for snap-lock receiving said offset segment of said pivot rod when said accessory is in a predetermined use position.

13. The apparatus as defined in claim 12 wherein said one end of said pivot rod is tapered to facilitate assembly of said pivot rod within said mounting bosses.

14. The apparatus as defined in claim 13 wherein said offset segment is offset approximately one half a diameter of said pivot rod.

15. The apparatus as defined in claim 14 wherein said mounting bosses are made of resilient polymeric material.

16. The apparatus as defined in claim 15 wherein said mounting bosses are made of polycarbonate.

17. The apparatus as defined in claim 16 wherein said accessory further includes means for receiving a second pivot rod.

* * * * *

UNITED STATES PATENT AND TRADEMARK OFFICE
CERTIFICATE OF CORRECTION

PATENT NO. : 5,039,153
DATED : August 13, 1991
INVENTOR(S) : Kenneth M. Lindberg et al.

It is certified that error appears in the above-identified patent and that said Letters Patent is hereby corrected as shown below:

```
Column 3, line 54:
   "best see" should be --best seen--;

Column 3, line 60:
   "axles 5" should be --axles 50G--;

Column 4, line 17:
   "sanity" should be --vanity--;

Column 4, line 18:
   After "position" insert --.--;

Column 4, line 27:
   After "lenses 36" insert --.--;
```

UNITED STATES PATENT AND TRADEMARK OFFICE
CERTIFICATE OF CORRECTION

PATENT NO. : 5,039,153

DATED : August 13, 1991

INVENTOR(S) : Kenneth M. Lindberg et al.

It is certified that error appears in the above-identified patent and that said Letters Patent is hereby corrected as shown below:

Column 4, line 43:
"assembly" should be --assemble--;

Column 4, line 57:
"are defend" should be --as defined--;

Column 6, line 9, claim 10:
"fictional" should be --frictional--.

Signed and Sealed this

Thirteenth Day of April, 1993

Attest:

STEPHEN G. KUNIN

*Attesting Officer*   Acting Commissioner of Patents and Trademarks